(12) United States Patent
Skaug

(10) Patent No.: US 8,380,774 B2
(45) Date of Patent: Feb. 19, 2013

(54) COEFFICIENT MEMORY FOR LEAST MEAN SQUARE FINITE IMPULSE RESPONSE FILTER

(75) Inventor: Steffen Skaug, Oslo (NO)

(73) Assignee: Tandberg Storage ASA, Oslo (NO)

( * ) Notice: Subject to any disclaimer, the term of this patent is extended or adjusted under 35 U.S.C. 154(b) by 1238 days.

(21) Appl. No.: 11/774,944

(22) Filed: Jul. 9, 2007

(65) Prior Publication Data

US 2009/0019102 A1 Jan. 15, 2009

(51) Int. Cl.
*G06F 17/10* (2006.01)
(52) U.S. Cl. ....................................... 708/323
(58) Field of Classification Search .......... 708/300–323, 708/445
See application file for complete search history.

(56) References Cited

U.S. PATENT DOCUMENTS

| | | | |
|---|---|---|---|
| 5,235,538 A | 8/1993 | Sumi et al. | |
| 5,392,315 A | 2/1995 | Laud | |
| 5,654,765 A * | 8/1997 | Kim | 708/323 |
| 5,974,007 A * | 10/1999 | Getreuer | 369/30.16 |
| 6,175,588 B1 * | 1/2001 | Visotsky et al. | 375/148 |
| 6,437,932 B1 * | 8/2002 | Prater et al. | 708/323 |
| 6,836,511 B1 * | 12/2004 | Marukawa | 708/323 |
| 7,127,481 B1 | 10/2006 | Lam | |
| 7,171,608 B2 * | 1/2007 | Aida et al. | 714/794 |
| 7,194,674 B2 * | 3/2007 | Okumura et al. | 708/323 |
| 7,751,295 B2 * | 7/2010 | Katsuki | 369/59.22 |
| 7,787,202 B2 * | 8/2010 | Lin et al. | 708/323 |
| 2004/0044712 A1 * | 3/2004 | Staszewski | 708/300 |
| 2006/0023780 A1 | 2/2006 | Jibry | |

OTHER PUBLICATIONS

Krukowski et al., Polyphase IIR Filter Banks for Subband Adaptive Echo Cancellation Applications, 2003 IEEE, pp. IV-405-IV-408.

* cited by examiner

*Primary Examiner* — David H Malzahn
(74) *Attorney, Agent, or Firm* — Schiff Hardin LLP

(57) ABSTRACT

A read channel of a magnetic recording apparatus includes a filter that uses filter coefficients to process the data detected by a read head from the magnetic recordable media. The coefficients change with time and circumstances. When data is read and found to pass error detection, the filter coefficient set used for the data is stored in a memory as a last good coefficient set. Upon failure of the filtering process, the coefficient set used is replaced with a coefficient set stored in the memory as the last good coefficient set.

13 Claims, 2 Drawing Sheets

COEFFICIENT MEMORY FOR LEAST MEAN SQUARE FINITE IMPULSE RESPONSE FILTER

BACKGROUND OF THE INVENTION

1. Field of the Invention

The present invention relates generally to the field of read channel equalization in a magnetic recording device and in particular to a read equalization level control in a tape drive.

2. Description of the Related Art

Magnetic recording devices such as magnetic tape drives are used for recording computer data for storage and retrieval. Various techniques have been developed over the years to improve the characteristics of data reading and writing on magnetic media.

On the read channel side, Finite Impulse Response (FIR) filters are widely used as a means of equalizing the read channel response to a given target response, for example PR4, EPR4, or the like. The response of these filters is controlled by a set of coefficients. Often the response of the FIR filter is changed during the operation of the tape drive in order to compensate for changes in channel characteristics, for example, changes in the recording media, the recording head, the electronics, and the like. Tape drives in particular must deal with the variations in the channel characteristics caused by the interchange of the recording media.

A general method for changing the FIR filter coefficients in order to optimize the FIR filter responses is by implementing LMS (Least Mean Square) hardware adaptability. The LMS algorithm needs a coefficient set as a starting point. Importantly, this starting point must be good enough to detect data in order for the LMS algorithm to have a valid input on the ideal sample values. Further, the LMS coefficients may develop by themselves to be unsuitable for data detection during changes in channel response, for example in dropout situations. This can result in a deadlock situation occurring.

The prior art devices provide that, when starting the data detection, the starting point for the coefficients of the FIR filter by the channel control system may be embedded in firmware. This starting point for the coefficients is also provided when a deadlock situation is detected.

SUMMARY OF THE INVENTION

The present invention provides magnetic recording system having a channel equalization, in particular a read channel equalization, controlled by a set of coefficients. A coefficient memory is provided in which is stored a coefficient set that has been used successfully for detecting data. Upon detection of errors in the data from the equalization process, the coefficient set being used is replaced by the coefficient set from the coefficient memory. Errors in the equalization of the read channel are thereby eliminated.

DETAILED DESCRIPTION OF THE PREFERRED EMBODIMENTS

Figure 1:
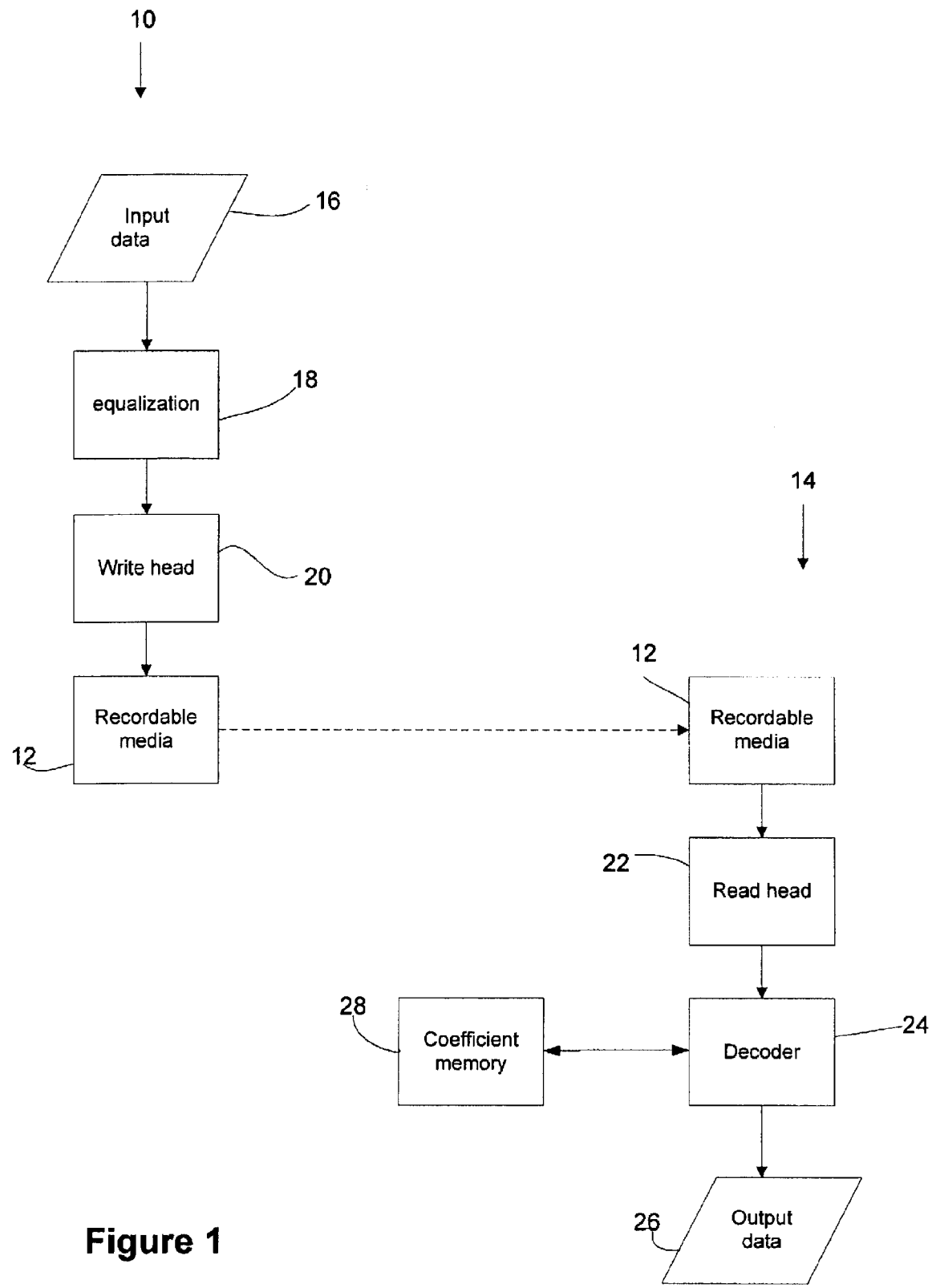
FIG. 1 is a block diagram of a magnetic recording system including a channel equalization apparatus and a coefficient memory according to the principles of the present invention.

In FIG. 1, a magnetic recording system includes a write channel 10 for writing data to a recording media 12 and a read channel 14 for reading the data from the recording media 12. In the preferred embodiment, input data 16 is provided on the write channel 10 to an equalization apparatus 18 that imposes an equalization function on the data stream prior to the data being recorded. The data with the equalization imposed thereon is provide to a write head 20 which writes the data to the recordable media 12. The recordable media 12 stores the data such as for data backup, transfer of the data to other computers or for other reasons.

The recordable media 12 may be any type of recordable media, but it preferably is a magnetic recordable tape, such as a tape in a cartridge. The data write/read apparatus for such media is a magnetic tape cartridge drive, which as well understood by those of skill in this art includes the necessary tape moving apparatus and guides, a read/write head and cartridge loading and ejecting mechanisms. The data write/read apparatus, commonly referred to as a tape drive, may be a component in a data backup system such as for a computer network, and can be a part of a so-called autoloader apparatus. Other magnetic recordable media and recording/reading systems may be provided instead and are encompassed within this invention.

The recordable media 12 may be read immediately by a read head 22, such as for purposes of confirming that the data has been correctly written, or it may be read after some period of time has passed. For example, the data could be used for data recovery from a backup set of some time ago. It is also possible that the recordable media 12 was recorded by another read/write apparatus and is being read by the present apparatus as part of a program installation or data transfer, for example. The read head 22, which can be in the same physical unit with the write head or may be separate, provides the signal detected from the recording media to an decoding apparatus 24. The decoder 24 decodes the signal and obtains the data 26 therefrom. The decoder 24 of one embodiment includes an analog-to-digital converter, a filter, and a detector as part of the detection path. The filter of the preferred embodiment operates according to filter coefficients and these coefficients change over the course of operation of the device. The coefficient values used by the filter at any given time comprise a set of coefficients.

The present invention provides that the set of coefficients that have been found to successfully perform the equalization during reading of the data is stored in a coefficient memory 28. The coefficient memory 28 receives and holds the coefficient set for use by the decoder 24, for example should problems arise in the data reading and writing. If an error occurs or if some other problem arises, the coefficient set is read from the memory 28 and provided to the decoder 24. The decoder 24 reverts back to the coefficient set stored in the coefficient memory 16. It is contemplated that the coefficient memory would also store the currently used coefficient set during the read operation.

The coefficient memory may be provided by a variety of different storage means, including as separate memory device or chip or as a portion of a larger memory or storage. The coefficient memory is preferably RAM or other solid-state memory, but may instead be disk memory or other types of storage.

In a preferred embodiment, the coefficient memory is a memory that is provided on the same chip as the FIR filter. The memory of one embodiment is a register, comprising several flip-flops, in the decoder chip. For example, the register may be a hardware controlled register.

The detector 24 determines whether data has been successfully received and passed a quality check. If so, the data is determined to be good data and coefficient set used to obtain that data is identified as a good coefficient set. The most recent good coefficient set is saved to the memory 28 in the preferred embodiment. It is also envisioned that the coefficient set may not be stored every time good data is determined but may be saved less often than at every good data determination. The coefficient set from a successful past use may be provided, including in the recent past or even the more distant past.

Figure 2:
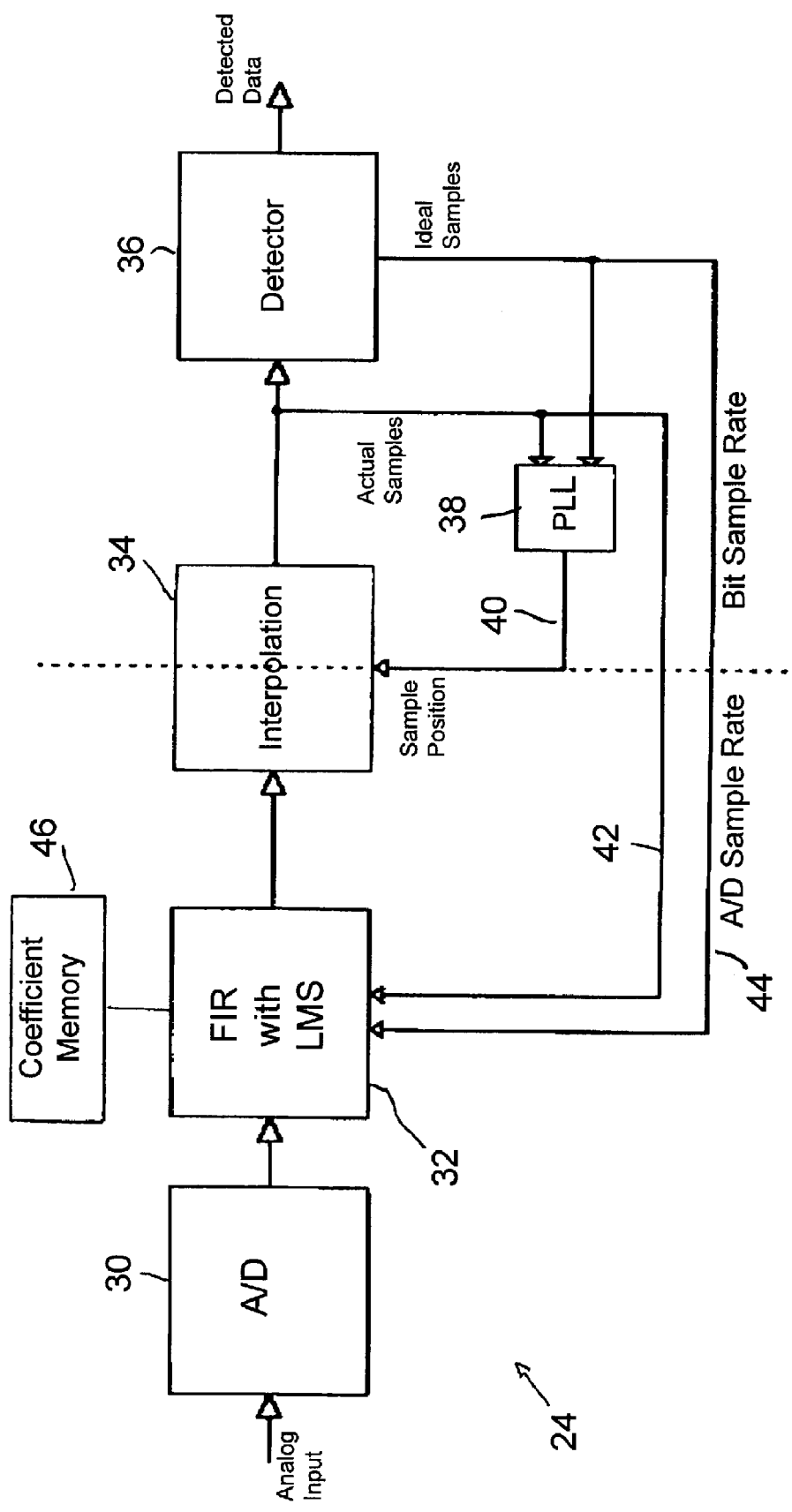
FIG. 2 is a block diagram of a read channel according to the present invention.

In further detail and with reference to FIG. 2, decoder apparatus 24 of a preferred embodiment includes an analog-to-digital converter 30 which receives the analog signal from the read head, a finite impulse response (FIR) filter 32 that includes a least means square (LMS) coefficient adaptation algorithm, a interpolator 34 which produces at its output actual samples, and a detector 36 that outputs the detected data. A phase locked loop (PLL) 38 is provided in a feedback loop 40 from the output of the interpolator 34 and from the detector 36 to provide sample position information to the interpolator 34. A feedback loop 42 is also provided from the output of the interpolator 34 and a feedback loop 44 from the detector 36 to the filter 32. This is a typical arrangement of components in the read channel and may be varied depending on the needs of the user, for example.

In particular, the filter 32 of a preferred embodiment is an FIR filter that has its tap coefficients controlled by the LMS algorithm. The coefficients are the tap weights of the FIR filter. These control the filter response. The FIR is used to equalize the read channel response to a specific partial response target (for example, PR4, EPR4, and the like). In one implementation, the filter uses twelve coefficients, although more or less could be used. The number of coefficients used is a tradeoff between performance and cost. There are a large variation in the gradient based LMS algorithms, all of which are encompassed within the present invention. Other filter types are possible.

According to the principles of the invention, a coefficient memory 46 is provided, connected in communication with the filter 32.

The read channel system uses an analog-to-digital converter 30 sample rate that is higher than the bit rate of the system. This is more complicated than it is to sample the analog-to-digital converter 30 at the bit sample rate, but is necessary in the tape drive because the speed variations in the tape drive are too fast to let the analog-to-digital converter 30 sample position be controlled by the phase locked loop 38. This would make the FIR filter 32 a part of the phase locked loop 38 and thereby cause delay in the feedback loop to be too long to achieve a quick response. So in a tape drive, the FIR filter 32 has to be outside the phase locked loop feedback loop 40 and has to operate at a higher sample rate than the bit rate. Interpolation 34 is used to bring the analog-to-digital converter 30 and the FIR filter 32 rate down to the bit rate that is suitable for the detector 36. The detector 36 of one embodiment is a Viterbi detector.

In the FIR filter block 32, the LMS function uses information from the detector 36 about the ideal sample values. The coefficients are updated according to the following formula:

$$C_{xn+1} = C_{xn} + uS_{xn}E_n,$$

where $C_{xn+1}$ is the new value of the FIR filter coefficient x at a sample n+1, $C_{xn}$ is the previous value of the FIR filter coefficient x at sample n, u is the LMS gain, $S_{xn}$ is the FIR filter input sample value at tap x at the sample n and $E_n$ is the difference between the actual FIR filter output and the ideal FIR filter output at sample n.

The LMS algorithm is adapted to the tape drive environment, where the FIR filter 32 and the detector 36 operate at different rates. Due to over-sampling, bit samples are not available as often as are the analog-to-digital samples. Therefore, the $E_n$ term of the LMS formula is only available for a fraction of the FIR filter input samples. Also, the $E_n$ term is not available at exactly the same point in time as the FIR filter input samples due to the interpolation. This handling is not updating the FIR filter coefficients if there is not a new $E_n$ available, and depending upon the sample position allocating the $E_n$ to the nearest FIR filter input samples.

The LMS coefficient algorithm needs a starting point for the coefficients. If this starting point is not good enough for detecting data, the LMS algorithm will not receive valid information on the ideal sample values, and will not operate. Over the operation of the filter, the coefficients change to accommodate changes in the system. Such changes in a tape drive system can include variations in temperature, drift in the electronics, head-to-tape interface variations, and the like.

The present invention provides the read channel 24 with the coefficient memory 46 for storing what is referred to as the Last Good Coefficient (LGC) set. Upon powering up the drive, or resetting of the drive, the LMS algorithm of the filter 32 is initialized with values from the memory 46 that have been determined to have been good. The way that the present device determines that the data is good is by performing an error check on the data. One such error check is a CRC (Cyclical Redundancy Checking) check. Another possibility is an ECC (Error Correcting Code) check. The data check is performed on a segment of the data stream and determines whether the segment was decoded correctly or not. The data segment that is present in a tape drive apparatus is commonly referred to as a data block. For tape drive devices that use magnetic recording tapes configured according to the LTO (Linear Tape-Open) standard, the data block is referred to as a codeword quad. The data block is typically a few hundred bytes and contains error detection or error correction code.

When the device is manufactured, the manufacturer provides an initial set of coefficient values in the memory 46. Later, when a data block is read and the data is determined to be good by running a CRC check, for example, the memory is updated with the coefficient set. As the filter operates and the coefficient values change, the latest good coefficient set is provided to the memory 46 to replace the previous coefficient set that was stored in the memory 46. Each time data successfully passes the CRC check, the memory is updated with the current coefficient set so the memory holds the last good coefficient set. The previous last good coefficient set is updated with a new coefficient set that has been successfully used to read data.

Data errors or bad data can occur from many sources. The coefficient set may go bad if the decoder does not decode correct data. In a magnetic tape drive, this may be the result of dropouts of data read from the tape or due to tape interference disturbances, tape speed variations, off-track conditions, or the like. It is also possible that the coefficients may go bad if the LMS algorithm does not operate properly due to instability, drift, or the like.

It is foreseen that a determination is made as to whether the data errors occurred due to the filtering operation in order to trigger the replacement of the current coefficient set with the last good coefficient set from the memory. The replacement of the current coefficient set is triggered by determination that a data segment has not been decoded correctly. The replacement of the coefficient set with the last good coefficient set is performed before reading of the next data segment is commenced. Alternatively, the replacement may be performed prior to decoding of the next segment. It is within the scope of the present invention that the replacement of a bad coefficient set with a good coefficient set from memory may occur anytime after discovery of the bad coefficient set.

If one or more data blocks have been read and have been determined to be bad, such as by failing a CRC check, the FIR filter coefficients which were used to obtain that data will be considered bad coefficients and no longer be used. Instead, the last good set of coefficients will be loaded from the memory into the filter and used to filter the data. The last good coefficient set as stored in the memory will almost certainly produce a valid data result. Specifically, the last good coefficient set has been verified to yield decoding of correct data and represents the last known good equalization of the read channel, so is highly likely to produce a good result if use again. This avoids a potential deadlock situation.

The preferred embodiment provides that the last good coefficient set is updated and loaded into the FIR filter 46 coefficient set by hardware. This relieves the burden of doing so from the drive firmware. In particular, a hardware control is provided for controlling the last good coefficient memory update and restore functions. The hardware control for the last good coefficient update and restore permits the system or drive firmware to be simplified and so decreases the complexity of the system. In one embodiment, the memory is a hardware controlled register within the decoder chip, although any memory type may be used according to the present invention.

Thus, there is shown and described a method and apparatus for avoiding data errors and deadlock situations due to bad filter coefficients. The last good coefficient set is stored in a memory and is retrieved from the memory for use in the filter when a data error is found.

Although other modifications and changes may be suggested by those skilled in the art, it is the intention of the inventors to embody within the patent warranted hereon all changes and modifications as reasonably and properly come within the scope of their contribution to the art.

I claim:

1. A read circuit for a magnet recording apparatus, comprising:
   a read head constructed and operable to read data from a magnetic recordable media;
   an analog-to-digital converter connected at an output of said read head for converting analog signals detected by said read head on said recordable media to a digital signal;
   a filter connected to receive an output from said analog-to-digital converter, said filter operating to perform an equalization function on data received from said analog-to-digital converter, said equalization function utilizing at least one coefficient for equalization, said filter using an updated coefficient to perform the equalization function wherein said updated coefficient is changed from a coefficient used in a prior equalization function, said filter having an output;
   a data quality checker connected to said output of said filter and operable to determine a quality of the filtered data using an error check; and
   a memory connected in communication with said filter, said memory receiving a good coefficient of said at least one coefficient of said equalization function for storage when said data quality checker determines that the data is of at least a predetermined quality, said memory storing said good coefficient for use when a subsequent equalization function is determined to decode data incorrectly, said memory connected to said filter to provide said stored good coefficient to said filter so as to replace a current updated coefficient of the filter when said data quality checker determines that the data produced using the updated coefficient has been decoded incorrectly.

2. A read circuit as claimed in claim 1, wherein said filter is a finite impulse response filter.

3. A read circuit as claimed in claim 1, wherein said equalization function is a least mean square algorithm.

4. A read circuit as claimed in claim 1, wherein said memory is provided with an initial value of filter coefficients upon manufacture and is updated with new coefficient values upon determination of the filtered data being of said predetermined quality.

5. A read circuit as claimed in claim 1, wherein said filter utilizes a set of coefficients that includes a plurality of coefficients for equalization; and said memory stores a last good set of coefficients and replaces a previously stored set of coefficients in said memory.

6. A method for reading data from a magnetic recordable media, comprising the steps of:
   reading data from the recordable media;
   decoding the data;
   filtering the decoded data;
   using at least one coefficient to filter the decoded data to provide filtered data;
   updating the at least one coefficient for subsequent filtering steps so that the at least one coefficient changes over time;
   determining a quality of the filtered data using an error check; and
   storing said at least one coefficient used in said filtering step as a good coefficient when said determining step determines the filtered data to be of at least a predetermined quality;
   filtering further decoded data in subsequent filtering steps;
   updating the at least one coefficient used in the subsequent filtering steps;
   determining that a filtering step has produced defective data;
   retrieving the good coefficient from memory when the determining step determines the defective data; and
   replacing the updated at least one coefficient with the good coefficient retrieved from memory so that a coefficient used to filter the decoded data is returned to a prior good coefficient.

7. A method as claimed in claim 6, wherein said filtering step includes performing a least mean square calculation using a plurality of coefficients; and
   said storing step includes storing said plurality of coefficients as a coefficient set.

8. A method as claimed in claim 6, wherein said storing step is performed each time the filtered data is determined to be at least said predetermined quality.

9. A method as claimed in claim 6, further comprising the steps of:
   detecting when the filtered data is of a quality below a predetermined quality threshold;
   retrieving said at least one coefficient from storage when the filtered data is below said predetermined quality threshold; and
   filtering said decoded data using said at least one coefficient from storage.

10. A method as claimed in claim 6, wherein said step of storing replaces at least one coefficient previously stored in storage.

11. A method as claimed in claim 6, wherein said step of storing is performed less often than each determination that the data is of said predetermined quality.

12. A method for reading data from a magnetic recordable media, comprising the steps of:
reading data from the recordable media;
decoding the data;
filtering the decoded data;
using a set of coefficients in said filtering step to filter the decoded data to provide filtered data;
determining a quality of the filtered data using an error check; and
storing said set of coefficients used by in said filtering step as a good set of coefficients when said determining step determines the filtered data to be of at least a predetermined quality;
subsequently performing a filtering step with an updated coefficient set that is changed from the good set of coefficients;
subsequently detecting that a filtered data segment obtained using the updated coefficient set is below a predetermined quality;
retrieving said stored set of coefficients when said filtered data segment below said predetermined quality has been detected; and
filtering decoded data using said retrieved set of coefficients.

13. A method as claimed in claim 12, wherein said step of storing includes
replacing an previously stored set of coefficients with a new set of coefficients.

* * * * *